(12) United States Patent
Gotou

(10) Patent No.: US 11,463,618 B2
(45) Date of Patent: Oct. 4, 2022

(54) APPARATUS FOR PROVIDING INFORMATION AND METHOD OF PROVIDING INFORMATION, AND NON-TRANSITORY STORAGE MEDIUM

(71) Applicant: NEC Corporation, Tokyo (JP)

(72) Inventor: Kouhei Gotou, Tokyo (JP)

(73) Assignee: NEC CORPORATION, Tokyo (JP)

( * ) Notice: Subject to any disclaimer, the term of this patent is extended or adjusted under 35 U.S.C. 154(b) by 330 days.

(21) Appl. No.: 16/620,570

(22) PCT Filed: Jun. 5, 2018

(86) PCT No.: PCT/JP2018/021581
§ 371 (c)(1),
(2) Date: Dec. 9, 2019

(87) PCT Pub. No.: WO2018/235595
PCT Pub. Date: Dec. 27, 2018

(65) Prior Publication Data
US 2020/0128177 A1 Apr. 23, 2020

(30) Foreign Application Priority Data
Jun. 20, 2017 (JP) .............................. JP2017-120735

(51) Int. Cl.
*G06K 9/00* (2022.01)
*H04N 5/232* (2006.01)
(Continued)

(52) U.S. Cl.
CPC ........... *H04N 5/23229* (2013.01); *G06F 3/01* (2013.01); *G09G 5/14* (2013.01); *H04N 7/181* (2013.01);
(Continued)

(58) Field of Classification Search
CPC .............. H04N 13/243; H04N 5/23254; G06F 3/1407; G06F 3/04883; B06K 35/00;
(Continued)

(56) References Cited

U.S. PATENT DOCUMENTS

2005/0038749 A1 2/2005 Fitch et al.
2005/0198661 A1 9/2005 Collins et al.
(Continued)

FOREIGN PATENT DOCUMENTS

JP 2005-514827 A 5/2005
JP 2005-267611 A 9/2005
(Continued)

OTHER PUBLICATIONS

International Search Report for PCT Application No. PCT/JP2018/021581, dated Aug. 21, 2018.
(Continued)

*Primary Examiner* — Phuoc H Doan
(74) *Attorney, Agent, or Firm* — Sughrue Mion, PLLC

(57) ABSTRACT

According to the present invention, there is provided an apparatus (10) for providing information, the apparatus including an acquisition unit (11) that acquires a captured image obtained by imaging the vicinity of a display; an image analysis unit (12) that detects a position on the display, which is being viewed by a person extracted from the captured image; and a control unit (13) that divides a display area of the display into multiple sub-areas, displays content on each of the multiple sub-areas, and makes a change to the displaying on the sub-area that is being viewed by the person extracted from the captured image.

13 Claims, 12 Drawing Sheets

(51) Int. Cl.
*G06F 3/01* (2006.01)
*G09G 5/14* (2006.01)
*H04N 7/18* (2006.01)
*H04N 21/431* (2011.01)
*H04N 21/478* (2011.01)

(52) U.S. Cl.
CPC . *H04N 21/431* (2013.01); *G06T 2207/30196* (2013.01); *H04N 21/478* (2013.01)

(58) Field of Classification Search
CPC ............... B60R 1/025; G06K 15/1885; G06K 15/1807; G06K 9/46; G06Q 40/08
USPC .................................................. 382/103, 298
See application file for complete search history.

(56) References Cited

U.S. PATENT DOCUMENTS

| | | | |
|---|---|---|---|
| 2009/0109126 A1 | 4/2009 | Stevenson et al. | |
| 2015/0084858 A1 | 3/2015 | Murakami et al. | |
| 2016/0141248 A1 | 5/2016 | Pueschner et al. | |
| 2016/0188962 A1 | 6/2016 | Taguchi | |
| 2017/0060319 A1* | 3/2017 | Seo | G06F 3/011 |
| 2017/0127011 A1 | 5/2017 | Okajima et al. | |

FOREIGN PATENT DOCUMENTS

| | | |
|---|---|---|
| JP | 2006-197373 A | 7/2006 |
| JP | 2009-500737 A | 1/2009 |
| JP | 2010-004355 A | 1/2010 |
| JP | 2011-146048 A | 7/2011 |
| JP | 2015-064513 A | 4/2015 |
| JP | 2016-122272 A | 7/2016 |
| WO | 2015/190093 A1 | 12/2015 |
| WO | 2016/141248 A1 | 9/2016 |

OTHER PUBLICATIONS

Japanese Office Action for JP Application No. 2019-525341 dated Nov. 4, 2020 with English Translation.

* cited by examiner

FIG. 3

| EXTRACTION ID | BROWSING PERSON ID | MONTH AND DATE | TIME | BROWSING POSITION | POSITION WITHIN IMAGE | ... |
|---|---|---|---|---|---|---|
| 00000001 | V00001 | 20170601 | 13:00:01 | (,) | (*,*) | ... |
| 00000002 | V00002 | 20170601 | 13:00:01 | (,) | (,) | ... |
| 00000003 | V00003 | 20170601 | 13:00:01 | — | (*,*) | ... |
| 00000004 | V00001 | 20170601 | 13:00:02 | (,) | (*,*) | ... |
| 00000005 | V00003 | 20170601 | 13:00:02 | (,) | (*,*) | ... |
| 00000006 | V00004 | 20170601 | 13:00:02 | (*,) | (*,*) | ... |
| ... | ... | ... | ... | ... | ... | ... |

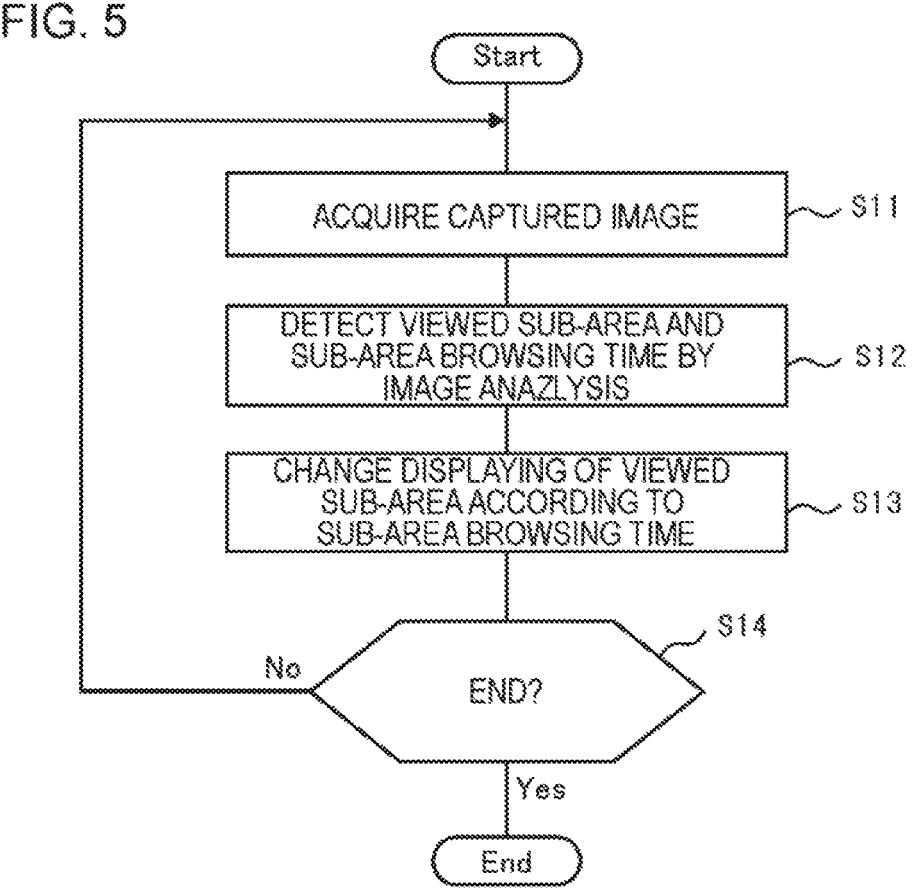

FIG. 6

| | NO FACES DETECTED | FACE DETECTION COMPLETED | | | |
|---|---|---|---|---|---|
| | | NUMBER OF GAZE-DETECTED PERSONS IS 0 | NUMBER OF GAZE-DETECTED PERSONS IS 1 | NUMBER OF GAZE-DETECTED PERSONS IS 2 | NUMBER OF GAZE-DETECTED PERSONS IS EQUAL TO OR GREATER THAN 3 |
| GAZE DETECTION THAT LASTS FOR LESS THAN 2 SECONDS | POWER SAVING MODE | ATTRACTION MODE (AUDIO, BLINKING LIGHT OR THE LIKE) | MESSAGE INTRODUCING DINER | MESSAGE INTRODUCING PLACE | MESSAGE INTRODUCING RESTAURANT |
| GAZE DETECTION THAT LASTS FOR 2 SECONDS TO LESS THAN 5 SECONDS | | --- | DISPLAY STILL IMAGE IN 4 DIVISIONS | DISPLAY STILL IMAGE IN 4 DIVISIONS | DISPLAY STILL IMAGE IN 4 DIVISIONS |
| GAZE DETECTION THAT LASTS FOR 5 SECONDS TO LESS THAN 30 SECONDS | | --- | REPRODUCE IMAGE WITH ATTENTION ON LARGE-SIZED SCREEN | REPRODUCE IMAGE WITH ATTENTION ON LARGE-SIZED SCREEN | REPRODUCE EACH IMAGE WITH ATTENTION |
| GAZE DETECTION THAT LASTS FOR 30 OR MORE SECONDS | | --- | STORE INFORMATION + COUPON | STORE INFORMATION + COUPON | STORE INFORMATION + COUPON |

APPARATUS FOR PROVIDING INFORMATION AND METHOD OF PROVIDING INFORMATION, AND NON-TRANSITORY STORAGE MEDIUM

This application is a National Stage Entry of PCT/JP2018/021581 filed on Jun. 5, 2018, which claims priority from Japanese Patent Application 2017-120735 filed on Jun. 20, 2017, the contents of all of which are incorporated herein by reference, in their entirety.

TECHNICAL FIELD

The present invention relates to an apparatus for providing information, a method of providing information, and a program.

BACKGROUND ART

In a method of displaying a visual image which is disclosed in Patent Document 1, a display area of a display is divided into a main display area and a sub-display area, and a visual image is displayed on each of the main display area and the sub-display area. Furthermore, in this displaying method, the visual image that draws a viewer's interest is detected on the basis of information on a viewer's gaze information and location information on a viewer's face image. Then, in the displaying method, in a case where the visual image that draws the interest is displayed in the sub-display area, the replacement of visual images is performed in such a manner that this visual image is displayed on the main display area.

In Patent Document 2, there is disclosed an apparatus for computing availability, the apparatus including a line-of-sight information acquisition unit that acquires information on a target person's line of sight, a line-of-sight state decision unit that decides a state in which multiple target persons turn their gaze on an object, on the basis of the information on the target person's line of sight, a relationship decision unit that decides a relationship among the multiple target persons, and an availability computation unit that computes an index value which indicates a likelihood that the object will be utilized by the target person, on the basis of the relationship between the multiple target persons, which are decided by the relationship decision unit, and on the state decided by the line-of-sight state decision unit.

In a method of displaying content which is disclosed in Patent Document 3, based on a recognition time of a gaze on a display panel and on the number of times that a gaze is diverted away from the display panel, an affirmation level that results from recognizing the gaze is obtained, and, based on the affirmation level, an evaluation is made of an advertisement that is displayed on the display panel. Then, based on a result of the evaluation, an advertisement that is to be displayed on the display panel is decided.

RELATED DOCUMENT

Patent Document

[Patent Document 1] Japanese Unexamined Patent Application No. 2011-146048 [Patent Document 2] Japanese Unexamined Patent Application No. 2016-122272 [Patent Document 3] Japanese Unexamined Patent Application No. 2015-64513

SUMMARY OF THE INVENTION

Technical Problem

There has been a problem that an advantage (for example, the effectiveness of the advertisement) that results from providing information cannot be enjoyed because content displayed on the display is not suitably changed depending on a situation of the viewer.

Solution to Problem

According to an aspect of the present invention, there is provided an apparatus for providing information, the apparatus including an acquisition unit that acquires a captured image obtained by imaging the vicinity of a display; an image analysis unit that detects a position on the display, which is being viewed by a person extracted from the captured image; and a control unit that divides a display area of the display into multiple sub-areas, displays content on each of the multiple sub-areas, and makes a change to the displaying on the sub-area that is being viewed by the person extracted from the captured image.

Furthermore, according to another aspect of the present invention, there is provided an apparatus for providing information, the apparatus including an acquisition unit that acquires a captured image obtained by imaging the vicinity of a display; an image analysis unit that analyzes the captured image, to extract a face of a person from the captured image and detect the number of persons who are viewing the display, and a display browsing time that is a period of time for which the display is being viewed; and a control unit that decides content that is to be displayed on the display, according to a result of the detection.

Furthermore, according to still another aspect of the present invention, there is provided a method of providing information, which is performed by a computer, the method including: an acquisition step of acquiring a captured image obtained by imaging the vicinity of a display; an image analysis step of detecting a position on the display, which is being viewed by a person extracted from the captured image; and a control step of dividing a display area of the display into multiple sub-areas, displaying content on each of the multiple sub-areas, and making a change to the displaying on the sub-area that is being viewed by the person extracted from the captured image.

Furthermore, according to still another aspect of the present invention, there is provided a program that causes a computer to function as: an acquisition unit that acquires a captured image obtained by imaging the vicinity of a display; an image analysis unit that detects a position on the display, which is being viewed by a person extracted from the captured image; and a control unit that divides a display area of the display into multiple sub-areas, displays content on each of the multiple sub-areas, and makes a change to the displaying on the sub-area that is being viewed by the person extracted from the captured image.

Furthermore, according to still another aspect of the present invention, there is provided a method of providing information, which is performed by a computer, the method including: an acquisition step of acquiring a captured image obtained by imaging the vicinity of a display; an image analysis step of analyzing the captured image, to extract a face of a person from the captured image and detect the number of persons who are viewing the display, and a display browsing time that is a period of time for which the display is being viewed; and a control step of deciding content that is to be displayed on the display, according to a result of the detection.

Furthermore, according to still another aspect of the present invention, there is provided a program that causes a computer to function as: an acquisition unit that acquires a captured image obtained by imaging the vicinity of a display; an image analysis unit that analyzes the captured image, to extract a face of a person from the captured image, and detect the number of persons who are viewing the display, and a display browsing time that is a period of time for which the display is being viewed; and a control unit that decides content that is to be displayed on the display, according to a result of the detection.

Advantageous Effects of Invention

According to the present invention, depending on a situation of a viewer, a change can be suitably made to content that is displayed on a display.

BRIEF DESCRIPTION OF THE DRAWINGS

The object described above and other objects, and features and advantages are further made apparent by suitable example embodiments that will be described below and the following drawings that are referred to for the description of the suitable example embodiments.

FIG. 3 is a diagram schematically illustrating an example of data that is generated by the apparatus for providing information according to the present example embodiment.

FIG. 5 is a block diagram illustrating an example of a flow for processing by the apparatus for providing information according to the present invention.

FIG. 6 is a diagram schematically illustrating an example of information that is utilized by the apparatus for providing information according to the present example embodiment.

DESCRIPTION OF EMBODIMENTS

First Example Embodiment

Figure 1:
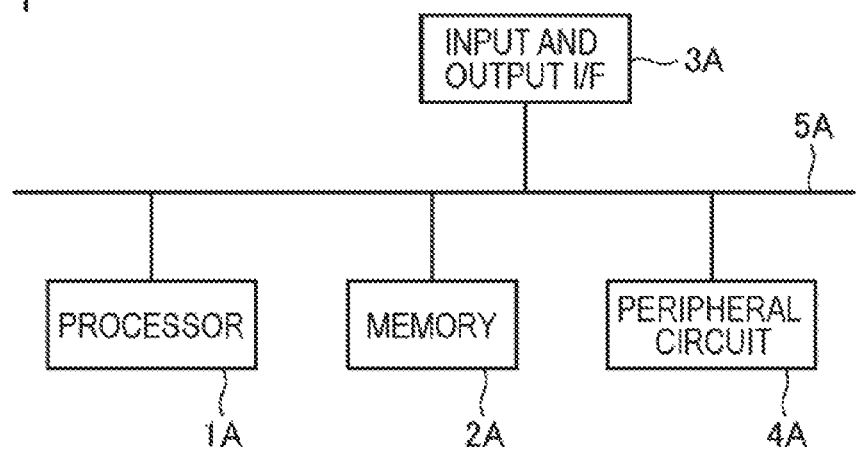
FIG. 1 is a block diagram illustrating an example of a hardware configuration of an apparatus for providing information according to the present example embodiment.

First, a general outline of an information providing system according to the present example embodiment is described. The information providing system according to the present example embodiment is a so-called digital signage system (this is also true for all of the following example embodiments). The information providing system includes a display that is installed in an arbitrary place, a camera that image-captures the vicinity of the display, and an apparatus for providing information that controls the display.

The display is installed in an arbitrary place. For example, the display is installed outdoors, indoors, or in a public area. The display outputs predetermined content (for example, a moving image, a still image, or audio) according to the control of the display. A file that contains the content which is to be output may be stored in advance in a memory device, and may be input from an external apparatus (for example, an apparatus for providing information) into the display.

The camera is configured in a manner that possibly captures a moving image. It should be noted that the camera may be configured in a manner that possibly captures still images successively every predetermined time (for example, every second). The camera is installed (fixed) at a location where the vicinity of the display (for example, a front area where a person who is watching the display is positioned) is possibly image-captured. Then, the camera transmits an image file (a moving image file or a still image file) that is generated by real-time processing to the apparatus for providing information.

The apparatus for providing information has an acquisition unit, an image analysis unit, and a control unit. The acquisition unit acquires a captured image (an image file) obtained by imaging the vicinity of the display. By analyzing the captured image, the image analysis unit not only extracts the face of a person from the captured image, but also detects a position on the display, which is being viewed by the extracted person. The control unit divides a display area of the display into multiple sub-areas. The control unit not only displays content on each of the multiple sub-areas, but also makes a change to the displaying on a sub-area that is being viewed by the person extracted from the captured image. For example, a change is made to the content that is displayed on the sub-area.

With the apparatus for providing information, a change is made to content that is displayed on a sub-area which is being viewed by a viewer without the content remaining the same (that is, the content undergoes a change), and thus viewer's attention to the sub-area can be increased much more. Particularly, a change is made to only the content that is displayed on the sub-area which is being viewed by the viewer instead of changes being made to items of content on all of the multiple sub-areas, and thus the viewer's attention to the sub-area can be increased much more.

Furthermore, a change is made to only content that is displayed on one sub-area (the sub-area that is being viewed by the viewer) instead of changes being made to items of content on all of the multiple sub-areas, and thus a load on processing by the display can be reduced.

Furthermore, a change is made to the content that is displayed on the sub-area which is being viewed by the viewer without the content remaining the same, and thus a greater amount of information can be transferred efficiently to the viewer.

It should be noted that the apparatus for providing information may be installed close to the display. The display and the apparatus for providing information may be configured to be integrated physically and/or logically into one piece and may be configured to be segmented from each other. In the case of the latter, the display and the apparatus for providing information are configured in a manner that possibly performs communication using arbitrary means.

In addition, the apparatus for providing information may be installed at a location that is at some distance away from the display, and the display may be controlled remotely. In this case, the display and the apparatus for providing information may be connected to each other through a communication network such as the Internet and may be connected to each other through a dedicated communication network.

The display and the camera that are included in the information providing system according to the present example embodiment can be realized in compliance with technologies in the related art. A configuration of the apparatus for providing information will be described in detail below.

First, an example of a hardware configuration of the apparatus for providing information is described. Each function unit that is included in the apparatus for providing information according to the present example embodiment may be realized with any combination of hardware and software based on a central processing unit (CPU) of an arbitrary computer, a memory, a program that is loaded onto the memory, a storage unit (it is possible to store a program that is downloaded from a storage medium, such as a compact disc (CD), a server on the Internet, or the like, in addition to a program that is stored in advance from a stage at which the apparatus is shipped), such as a hard disk which stores the program, and an interface for connection to a network. Then, it is understood by a person of ordinary skill in the art that there are various examples of modification to the method or apparatus that realizes this.

FIG. 1 is a block diagram illustrating the hardware configuration of the apparatus for providing information according to the present example embodiment. As illustrated in FIG. 1, the apparatus for providing information has a processor 1A, a memory 2A, an input and output interface 3A, a peripheral circuit 4A, and a bus 5A. Various modules are included in the peripheral circuit 4A. It should be noted that the apparatus for providing information may be configured with multiple apparatuses that are physically or logically separated. In this case, each of the multiple apparatuses may have the processor 1A, the memory 2A, the input and output interface 3A, the peripheral circuit 4A, and the bus 5A.

The bus 5A is a data transfer path for data reception and transmission that are performed among the processor 1A, the memory 2A, the peripheral circuit 4A, and the input and output interface 3A. The processor 1A is an arithmetic processing unit, such a CPU or a graphic processing unit (GPU). The memory 2A, for example, is a memory, such as a random access memory (RAM) or a read only memory (ROM). The input and output interfaces 3A include an interface for acquiring information from an input device (for example, a keyboard, a mouse, a microphone, a physical key, a touch panel display, a code reader, or the like), an external apparatus, an external server, an external sensor, or the like, and an interface for outputting information to an output device (for example, a display, a speaker, a printer, a mailer, or the like), an external apparatus, an external server, or the like. The processor 1A can output a command to each module and can perform arithmetic operation on the basis of results of arithmetic operations by these modules.

Figure 2:
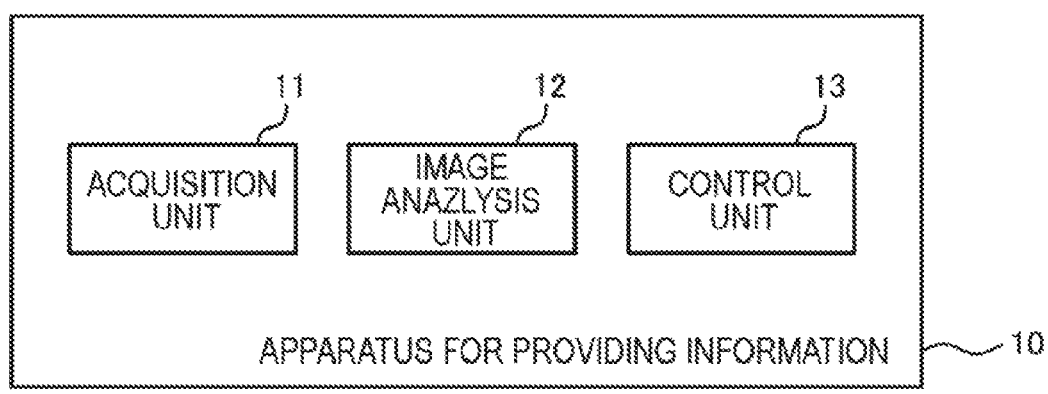
FIG. 2 is an example of a functional block diagram of the apparatus for providing information according to the present example embodiment.

Next, a functional configuration of the apparatus for providing information will be described. FIG. 2 illustrates an example of a functional block diagram of an apparatus 10 for providing information. As described, the apparatus 10 for providing information has an acquisition unit 11, an image analysis unit 12, and a control unit 13.

The acquisition unit 11 acquires the captured image (the image file) obtained by imaging the vicinity of the display, from the camera described above. The image file includes multiple captured images (frames). The acquisition unit 11 may acquire information that possibly determines the date and time at which each of multiple captured images is captured, from the camera described above.

By analyzing the captured image, the image analysis unit 12 not only extracts the face of a person from the captured image, but also a position on the display, which is being viewed by the extracted person (first detection process). Furthermore, the image analysis unit 12 detects a sub-area browsing time that is a period of time for which the person who is extracted from the captured image is viewing a predetermined sub-area (a sub-area that is being viewed at the timing of the image-capturing) (second detection process). The image analysis unit 12 may analyze all captured images that are included in the image file, and may analyze an image captured every predetermined time (for example, every second or every 3 seconds).

First, the first detection process is described. Means for extracting the face of the person from the captured image is not particularly limited, and every technology in the related art can be employed.

Furthermore, the image analysis unit 12 can detect a position on the display, which is being viewed by the extracted person, by utilizing every technology in the related art. For example, the position on the display, which is being viewed by the person, can be detected on the basis of a direction of the person's gaze, a distance between the person and the camera, a position of the face of the person within the captured image, a relative relationship that is retained in advance between the camera and the display (for example, an angle between an optical axis of the camera and a display area (a surface) of the display, a distance between the camera and the display, or the like).

The direction of the gaze of the person may be determined by image analysis and may be determined by other means. In the case of the image analysis, the direction of the gaze can be inferred, for example, on the basis of a direction of the face, a position of an eyeball, or the like. The direction of the face can be estimated on the basis of a position of a characteristic portion, such as an eye, a nose, or a mouth, within a face area, a relative positional relationship among these, or the like.

Furthermore, the distance between the person and the camera may be determined by the image analysis or may be determined by other means. In the case of the image analysis, for example, inference can be made on the basis of a size of the face (an area occupied within the captured image) or the like.

FIG. 3 schematically illustrates an example of data resulting from the analysis, which is generated by the first detection process. For example, the image analysis unit 12 analyzes the captured image transmitted from the camera, by real-time processing, and adds a new result of the analysis to the data resulting from the analysis.

In the data resulting from the analysis, which is illustrated, an extraction identifier (ID), a browsing person ID, a month and date, a time, a browsing position and a position within an image are associated with each other. It should be noted that other pieces of information may be included.

"month and date and time" indicates a date and time at which each captured image (each frame) was captured. In the case of an example that is illustrated, it is understood that extraction IDs 0000001 to 0000003, of which these pieces of information are consistent with one other, are pieces of information that are obtained by analyzing the same captured image. In the same manner, it is understood that extraction IDs 0000004 to 0000006 are pieces of information that are obtained by analyzing the same captured image.

"extraction ID" is an ID that is attached each time a person is extracted from the captured image. In a case where multiple persons are extracted from one image, different IDs are attached to the multiple extractions, respectively. Furthermore, in a case where a certain person is extracted from a first captured image and a second captured image, different extraction IDs are attached to the extractions, respectively.

"browsing person ID" is an ID that is attached to each of the persons who are extracted from the captured image. The image analysis unit 12 groups faces that are considered as be ones of the same persons who are present across multiple captured images, into one group, and attached one browsing person ID to the one group.

For example, the image analysis unit 12 associates faces of the same persons who are present across the first and second captured images, with each other, on the basis of positions of n (n is equal to or greater than 1) faces that are extracted from the first captured image, within the captured image, and on positions of m (m may be equal to or greater than 1 and may be the same as n) faces that are extracted from the second captured image that immediately follows the first captured image. For example, faces may be associated with each other if they satisfy the condition that "a distance between a position (position within image that is illustrated in FIG. 3) of a face, within the captured image, which is extracted from the first captured image and a position (position within image that is illustrated in FIG. 3) of a face, within the captured image, which is extracted from the second captured image, is equal to or greater than a predetermined value."

This processing is performed on all pairs of two captured images that are successive one after another, and thus faces of the same persons who are present successively within the captured images can be grouped into one group. Then, the image analysis unit 12 can attach the browsing person ID to every group.

It should be noted that as another example of the processing, the image analysis unit 12 may extract a feature value of the face of each of the persons extracted from the captured image. Then, the same persons who are present across multiple captured images may be grouped into one group by utilizing the feature value and the browsing person ID may be attached to every group.

In the present example embodiment, any method can be employed. However, in the case of the former, there is no need to acquire information (a feature value of a face) that identifies a browsing person. For this reason, the former can be said to be a preferable method that is employed to ensure privacy.

"browsing position" indicates a position on the display, which is being viewed by each of the extracted persons. For example, the browsing position may be indicated with a two-dimensional coordinate system in which an arbitrary position on the display is set to be an origin and in which arbitrary directions with respect to the display are to be an x-axis and a y-axis, respectively. It should be noted that in a case where the browsing position is not on the display, information indicating that the browsing position is not on the display may be registered. In the case of an example that is illustrated, extraction ID 0000003 has a browsing position that is empty. Accordingly, it is understood that at 13:00:01 on Jun. 1, 2017, ID V00003 did not visually recognize anywhere on the display.

"position within image" indicates a position of the face of each of the extracted persons, within the captured image. For example, a position of a face within the captured image may be indicated with a two-dimensional coordinate system in which an arbitrary position within the captured image is set to be an origin and in which arbitrary directions with respect to the captured image are to be an x-axis and a y-axis, respectively.

Next, the second processing will be described. As described above, in the second processing, the image analysis unit 12 detects the sub-area browsing time that is the period of time for which the person extracted from the captured image is viewing a predetermined sub-area (a sub-area that is being viewed at the timing of the image-capturing). The sub-area browsing time may be a period of time for which the person successively browses the predetermined sub-area without averting the person's eyes from it, until the timing of the image-capturing, and may be a cumulative time for which the person browses the sub-area until the timing of the image-capturing.

For example, on the basis of the data resulting from the analysis, which is illustrated in FIG. 3, the image analysis unit 12 detects a period of time for which each of the persons extracted from the most recently captured image views a sub-area that is being viewed at the timing of the image-capturing, until the timing of the image-capturing.

Figure 4:
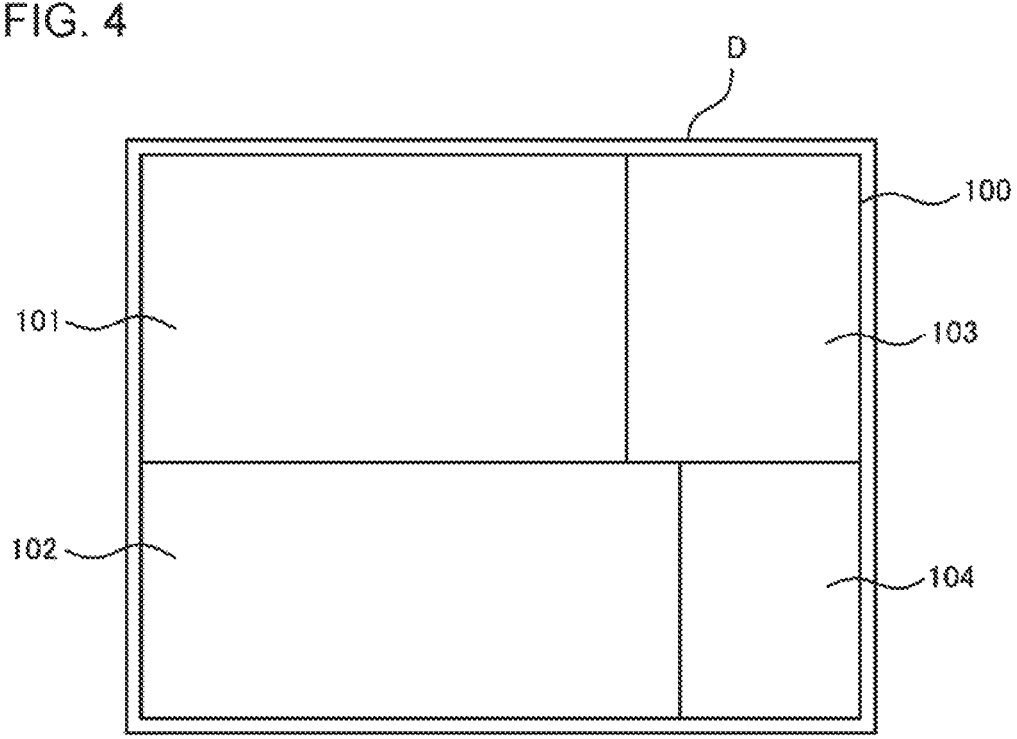
FIG. 4 is a diagram schematically illustrating an example of a mode for displaying on a display according to the present example embodiment.

In the present example embodiment, as illustrated in FIG. 4, the display area 100 of a display D is divided into multiple sub-areas 101 to 104, and content is displayed on each of the multiple sub-areas 101 to 104. The number of the sub-areas or a layout is not limited to the one that is illustrated.

The image analysis unit 12 in advance retains layout information on the multiple sub-areas. Then, on the basis of the layout information and, for example, information on the browsing position that is included in the data resulting from the analysis, as illustrated in FIG. 3, the image analysis unit 12 can determine which sub-area each person extracted at each timing is viewing. Then, on the basis of a result of the determination, the image analysis unit 12 can compute the sub-area browsing time described above.

With reference again to FIG. 2, for example, the control unit 13, as illustrated in FIG. 4, divides the display area 100 of the display D into the multiple sub-areas 101 to 104 and displays content on each of the multiple sub-areas 101 to 104. The number of the sub-areas or the layout is not limited to the one that is illustrated.

Furthermore, the control unit 13 makes a change to the displaying on a sub-area that is being viewed by a person extracted from the captured image. For example, the control unit 13 decides content that is to be displayed on a sub-area which is being viewed at the timing of the image-capturing by each of the persons extracted from the most recently captured image, according to the sub-area browsing time for which the sub-area is viewed until the timing of the image-capturing. Then, the control unit 13 displays the decided content on the sub-area. For example, an advertisement or the like is given as an example of the content that is to be displayed, but no limitation to this is imposed.

For example, the control unit 13 may display a still image in a case where the sub-area browsing time is shorter than a first reference time and may display a moving image in a case where the sub-area browsing time is equal to or longer than the first reference time. The first reference time is arbitrarily set in advance. The still image is not limited to an entire sub-area being necessarily stationary, and a portion (for example, a letter, a symbol, or the like, which are not the advertisement itself) of the image may move.

Furthermore, when the sub-area browsing time is equal to or longer than the second reference time, the control unit 13 may display coupon information. The second reference time is arbitrarily set in advance.

The following processing can be realized by combining these two examples. For example, the display is installed in a shopping center in which multiple stores concentrate. First, the control unit 13 displays attribute information (a name, a place, a photograph of an external appearance, a product, or the like) of each of the multiple stores on each of the multiple sub-areas, using a still image.

Then, when a certain person views a certain sub-area and the sub-area browsing time for which the sub-area is being viewed is equal to or longer than the first reference time, the control unit 13 starts to reproduce a moving image including more detailed information on the store on the sub-area.

It should be noted that when the browsing position of the person who is viewing the sub-area moves out of the sub-area while the reproduction is in progress, the control unit 13 may temporarily stop reproducing the moving image. Then, when the browsing position of the person returns to the sub-area, the temporary stop may be canceled and the reproduction may be resumed starting from a point in the moving image where the temporary stopping occurs. Furthermore, while the reproduction is in progress, when the person who is viewing the sub-area is not included the captured image (when the person is not present in front of the display), the control unit 13 may stop reproducing the moving image and may return to displaying of the original still image on the sub-area.

Then, when the reproduction of the moving image is finished to the end, the control unit 13 displays coupon information on the store on the sub-area. The displaying of the coupon information in response to the finishing of the reproduction of the moving image can be realized by suitably setting the second reference time.

It should be noted that the control unit 13 can individually make a change to content that is displayed on each of the multiple sub-areas, without making a change to a layout (a size, a specification for arrangement, or the like) of the multiple sub-areas on the display.

In addition, in a case where the face of a person is not extracted from the captured image, the control unit 13 may cause the display to operate in a power saving mode. In the power saving mode, the display performs an operation that consumes less power than in a normal mode. For example, in the power saving mode, brightness of the display is lower than in the normal mode.

In addition, the control unit 13 may introduce a store or the like using a detailed moving image containing a detail, on a sub-area that is being viewed by a person, and may introduce a store or the like using a moving image containing a digest or simple information, on a sub-area that is not being viewed by a person. Furthermore, the control unit 13 may display a still image that is one portion of the moving image, on a sub-area that is not being viewed by a person, and may display a moving image on a sub-area that is being viewed by a person.

In addition, the control unit 13 may display a moving image containing a digest or simple information (for example, information that introduces an outline of a store or the like) in a case where the sub-area browsing time is shorter than the first reference time, and may display a moving image containing detailed information (for example, information that introduces a detail of a store or the like) when the sub-area browsing time becomes equal to or longer than the first reference time.

Next, with reference to FIG. 5, an example of a flow for processing by the apparatus 10 for providing information according to the present example embodiment will be described.

In S11, the acquisition unit 11 acquires the captured image obtained by imaging the vicinity of the display.

In S12, by analyzing the captured image, the image analysis unit 12 not only extracts the face of a person from the captured image, but also detects a position on the display, which is being viewed by the extracted person. Furthermore, for example, on the basis of the data resulting from the analysis, as illustrated in FIG. 3, the image analysis unit 12 detects a period of time (the sub-area browsing time) for which each of the persons extracted from the most recently captured image views a sub-area that is being viewed at the timing of the image-capturing, until the timing of the image-capturing.

In S13, the control unit 13 makes a change to the displaying on a sub-area according to the sub-area browsing time for which a person extracted from the captured image is viewing the sub-area. For example, the control unit 13 decides content that is to be displayed on the sub-area according to the sub-area browsing time. Then, the control unit 13 displays the decided content on the sub-area.

Thereafter, while a signal that ends processing is not input (No in S14), the processing described above is repeated.

With the information providing system according to the present example embodiment, which is described above, a change is made to the content that is displayed on the sub-area which is being viewed by the viewer without the content remaining the same (that is, the content undergoes a change), and thus the viewer's attention to the sub-area can be increased much more. Particularly, a change is made to only the content that is displayed on the sub-area which is being viewed by the viewer instead of changes being made to items of content on all of the multiple sub-areas, and thus the viewer's attention on the sub-area can be increased much more.

Furthermore, a change is made to only the content that is displayed on one sub-area (the sub-area that is being viewed by the viewer) instead of changes being made to items of content on all of the multiple sub-areas, and thus the load on the processing by the display can be reduced.

Furthermore, a change is made to the content that is displayed on the sub-area which is being viewed by the viewer without the content remaining the same, and thus a greater amount of information can be transferred efficiently to the viewer.

Furthermore, with the information providing system according to the present example embodiment, the period of time (the sub-area browsing time) for which a person is viewing a predetermined sub-area can be detected, and content that is to be displayed on the predetermined sub-area can be accordingly decided. A change is made to the content that is displayed according to a change in the sub-area browsing time, and thus a viewer's interest can be drawn without the viewer being bored with the content that is displayed on the sub-area.

Furthermore, when, without considering the sub-area browsing time, a change is simply made to the content that is displayed only in response to the visitor's viewing, there is a likelihood that switching process will be performed unnecessarily on content. For example, there is a likelihood that a change will be made to content each time a pass-by glances at a sub-area. According to the present example embodiment, switching is performed on content due to the sub-area browsing time exceeding a threshold, and thus a process for switching to unnecessary content can be avoided.

Second Example Embodiment

An information providing system according to the present example embodiment has a different configuration of the apparatus 10 for providing information than that according to the first example embodiment. That is, configurations of the display and the camera are the same as those according to the first example embodiment.

The apparatus 10 for providing information according to the present example embodiment is different from that according to the first example embodiment, in that details of control of the display are decided on the basis of the sub-area browsing time, which is described in the first example embodiment, and the number of persons who are viewing each of the multiple sub-areas. Other configurations are the same as those according to the first example embodiment. The details will be described below.

An example of the hardware configuration of the apparatus 10 for providing information is the same as that according to the first example embodiment.

An example of the functional block of the apparatus 10 for providing information according to the present example embodiment is illustrated in FIG. 2 in the same manner as that according to first example embodiment. As described, the apparatus 10 for providing information has the acquisition unit 11, the image analysis unit 12, and the control unit 13. A configuration of the acquisition unit 11 is the same as that according to the first example embodiment.

In addition to the function which is described in the first example embodiment, the image analysis unit 12 further has a function of detecting the number of the persons who are viewing each of the multiple sub-areas.

For example, the image analysis unit 12 detects the number of the persons who are viewing each of the multiple sub-areas, within the most recently captured image. Furthermore, as described according to the first example embodiment, the image analysis unit 12 detects the period of time (the sub-area browsing time) for which each of the persons extracted from the most recently captured image views a sub-area that is being viewed at the timing of the image-capturing, until the timing of the image-capturing.

For example, the control unit 13, as illustrated in FIG. 4, the display area 100 of the display D is divided into the multiple sub-areas 101 to 104 and displays content on each of the multiple sub-areas 101 to 104. The number of the sub-areas or the layout are not limited to the one that is illustrated.

Furthermore, the control unit 13 makes a change to the displaying on the sub-area that is being viewed by the person extracted from the captured image. For example, the control unit 13 makes a change to the content that is displayed on the sub-area.

The control unit 13 according to the present example embodiment decides the content that is to be displayed on the sub-area which is being viewed at the timing of the image-capturing by each of the persons extracted from the most recently captured image, according to the sub-area browsing time for which the sub-area is viewed until the timing of the image-capturing and the number of the persons who are viewing the sub-area at the timing of the image-capturing. Then, the decided content is displayed on the sub-area. It should be noted that the control unit 13 can individually make a change to the content that is displayed on each of the multiple sub-areas, without making a change to the layout (a size, a specification for arrangement, or the like) of the multiple sub-areas on the display.

For example, the control unit 13 may display a still image in a case where the number of the persons, the sub-area browsing time of each of whom is equal to or shorter than a third reference time, is smaller than the first reference number of persons, and may display a moving image in a case where the number of the persons, the sub-area browsing time of each of whom is equal to or longer than the third reference time, is equal to or greater than the first reference number of persons. The third reference time and the first reference number of persons are arbitrarily set in advance. The still image is not limited to an entire sub-area being necessarily stationary, and a portion (for example, a letter, a symbol, or the like, which are not the advertisement itself) of the image may move.

Furthermore, the control unit 13 may display a moving image containing a digest or simple information (for example, information that introduces an outline of a store or the like) in a case where the number of the persons, the sub-area browsing time of each of whom is equal to or longer than the third reference time, is smaller than the first reference number of persons, and may display a moving image containing detailed information (for example, information that introduces a detail of a store or the like) in a case where the number of the persons, the sub-area browsing time of each of whom is equal to or longer than the third reference time, is equal to or greater than the first reference number of persons.

Furthermore, the control unit 13 may display coupon information when the number of the persons, the sub-area browsing time of each of whom is equal to or longer than a fourth reference time, is equal to or greater than a second reference number of performs. The fourth reference time and the second reference number of persons are arbitrarily set in advance.

As a modification example of the present example embodiment, the control unit 13 may make a change to a layout of multiple sub-areas on the display, according to the number of the persons who are viewing each of the multiple sub-areas. For example, the control unit 13 may set a ratio of an area occupied by at least one of the multiple sub-areas on the display to be a ratio in accordance with a ratio of the number of the persons who are viewing the sub-area. In addition, the control unit 13 may perform control in such a manner that the greater the number of the persons who are viewing a sub-area, the greater a ratio of an area occupied by the sub-area.

Furthermore, the control unit 13 may perform switching on brightness of each of the multiple sub-areas on the display, according to the number of the persons who are viewing each of the multiple sub-areas. In this case, the control unit 13 may set the brightness to be low in a case where the number of persons who are viewing the sub-area is smaller than a predetermined number (for example, is smaller than 1), and may set the brightness to be high in a case where the number of persons who are viewing the sub-area is equal to or greater than the predetermined number (for example, is equal to or greater than 1). In addition, the control unit 13 may increase the brightness according to an increase in the number of the persons who are viewing the sub-area.

Furthermore, in a case where the face of a person is not extracted from the captured image, the control unit 13 may cause the display to operate in the power saving mode.

Furthermore, in a case where the face of a person is extracted from the captured image, but where the number of the persons who are viewing the display is smaller than the predetermined number (for example, is smaller than 1), the control unit 13 may cause the display to perform an operation of drawing person's attention. For example, the audio saying "we provide useful information" or the like may be output on the display, and person's attention may be drawn using a blinking light or the like.

Figure 12:
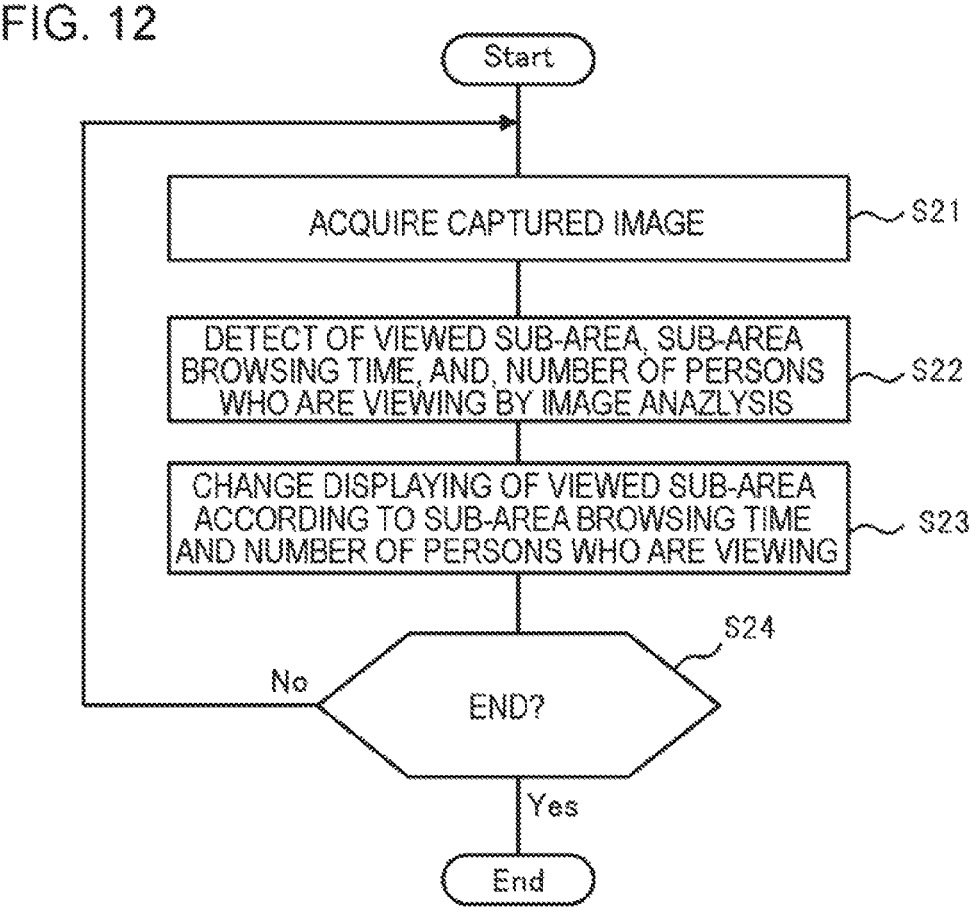
FIG. 12 is a block diagram illustrating an example of the flow for processing by the apparatus for providing information according to the present invention.

Next, with reference to FIG. 12, an example of a flow for processing by the apparatus 10 for providing information according to the present example embodiment will be described.

In S21, the acquisition unit 11 acquires the captured image obtained by imaging the vicinity of the display.

In S22, by analyzing the captured image, the image analysis unit 12 not only extracts the face of a person from the captured image, but also detects a position on the display, which is being viewed by the extracted person. Furthermore, for example, on the basis of the data resulting from the analysis, as illustrated in FIG. 3, the image analysis unit 12 detects the period of time (the sub-area browsing time) for which each of the persons extracted from the most recently captured image views the sub-area that is being viewed at the timing of the image-capturing, until the timing of the image-capturing, and the number of the persons who are viewing each of the multiple sub-areas at the timing of the image-capturing.

S23, the control unit 13 makes a change to the displaying on a sub-area according to the sub-area browsing time for which a person extracted from the captured image is viewing the sub-area and the number of the persons who are viewing the sub-area. For example, the control unit 13 decides content that is to be displayed on the sub-area according to the sub-area browsing time and the number of the persons who are viewing the sub-are. Then, the control unit 13 displays the decided content on the sub-area. For example, the control unit 13 may display a still image in the case where the number of the persons, the sub-area browsing time of each of whom is equal to or shorter than the third reference time, is smaller than the first reference number of persons, and may display a moving image in the case where the number of the persons, the sub-area browsing time of each of whom is equal to or longer than the third reference time, is equal to or greater than the first reference number of persons.

Thereafter, while a signal that ends processing is not input (No in S24), the processing described above is repeated.

With the information providing system according to the present example embodiment, which is described above, an advantageous effect that is the same as that according to the first example embodiment can be realized.

Furthermore, with the information providing system according to the present example embodiment, in response to the predetermined number of persons or greater gazing at a sub-area, switching can be performed on content that is displayed on the sub-area. With such a method, for example, in a case where a group of multiple persons are browsing the display, by performing switching on content that is displayed, content that draws an interest, among a group of items of content can be easily recognized.

For example, when pieces of guide information "when n or more persons fix their gaze on an advertisement of a predetermined store, switching is performed on contents of the advertisement," "when n or more persons fix their gaze on an advertisement of a predetermined store and watch the advertisement in a moving image to the end, a wonderful present is provided," and so forth are provided in advance to browsing persons, the browsing persons can enjoy browsing with a feeling of playing a game. In this case, because it can be expected that the number of persons who views an advertisement increases, the effectiveness of the advertisement increases.

Third Example Embodiment

An information providing system according to the present example embodiment has a different configuration of the apparatus 10 for providing information than those according to the first and second example embodiments. That is, configurations of the display and the camera are the same as those according to the first and second example embodiments. The details will be described below.

An example of the hardware configuration of the apparatus 10 for providing information is the same as those according to the first and second example embodiments.

An example of a functional block of the apparatus 10 for providing information according to the present example embodiment is illustrated in FIG. 2 in the same manner as those according to the first and second example embodiments. As described, the apparatus 10 for providing information has the acquisition unit 11, the image analysis unit 12, and the control unit 13. A configuration of the acquisition unit 11 is the same as those according to the first and second example embodiments.

The image analysis unit 12 performs the first detection process according to the first example embodiment, which is described above, and, for example, obtains the data resulting from the analysis as illustrated in FIG. 3. It should be noted that the image analysis unit 12 may perform the second detection process according to the first example embodiment, which is described above.

Then, on the basis of the data resulting from the analysis, which is described above, the image analysis unit 12 detects the number of the persons who are viewing the display, and a period of time (a display browsing time) for which the display is browsed, until the timing of the image-capturing, from the most recently captured image. Furthermore, the image analysis unit 12 may detect a position on the display, which is being viewed by each of the extracted persons. The display browsing time may be a period of time for which the person successively browses the display without averting the person's eyes from it, until the timing of the image-capturing, and may be a cumulative time for which the person browses the display until the timing of the image-capturing.

The control unit 13 decides the detail of the control of the display, for example, content that is to be displayed, or an operation mode, according to a result of the detection by the image analysis unit 12.

For example, the control unit 13 may retain in advance correspondence information, as illustrated in FIG. 6, which results from associating a period of time (the display browsing time) that elapsed after a gaze is detected, the number of the persons who are viewing the display, and the detail of the control of the display with each other. Then, on the basis of the correspondence information, the control unit 13 may decide the detail of the control of the display. It should be noted that a numerical value and a detail that are indicated by the correspondence information in FIG. 6 are examples, and that other details can be available.

At this point, the correspondence information that is illustrated in FIG. 6 is described. In the case of the correspondence information that is illustrated in FIG. 6, if the face of a person is not extracted from the captured image (gaze detection that lasts for 0 seconds or more and less than 2 seconds—no faces detected), that is, if a person who faces toward the display is not present in front of the display, the control unit 13 causes the display to operate in the power saving mode.

Furthermore, in a case where the face of a person is extracted from the captured image, but where the number of the persons who are viewing the display is 0 (gaze detection that lasts for 0 seconds or more and less than 2 seconds—face detected: the number of gaze-detected persons is 0), in a customer attraction mode, the control unit 13 causes the display to perform an operation of drawing person's attention. In the customer attraction mode, for example, the audio saying "we provide useful information" or the like may be output from the display, and a person's attention may be drawn using a blinking light or the like.

Furthermore, in a case where the face of a person is extracted from the captured image and where a person who is viewing the display is present, the control unit 13 causes the display to perform processing in accordance with the number of the persons who are viewing the display and the display browsing time.

Specifically, in a case where the display browsing time is less than 2 seconds (gaze detection that lasts for 0 seconds or more and less than 2 seconds), the control unit 13 displays a guide message indicating that predetermined information starts to be provided from now on, using a still image (a digest or a moving image may be used). This guide message is displayed on the entire display. That is, at this stage, the display area of the display is not divided into multiple sub-areas. It should be noted that the still image is not limited to the entire display being necessarily stationary, and a portion (for example, a letter, a symbol, or the like, which are not the advertisement itself) of the image may move.

It should be noted that it is assumed that information which is to be provided is set to be information in accordance with the number of the persons who are viewing the display. For example, information on a store (for example, a diner) where one person alone can visit comfortably may be provided in a case where the number of the persons who are viewing the display is 1. Furthermore, information on a store for a couple (for example, a place to bring a date) is provided in a case where the number of the persons who are viewing the display is 2, and information on a store for a family (for example, a restaurant) is provided in a case where the number of the persons who are viewing the display is equal to or greater than 3.

Furthermore, when the display browsing time is 2 or more seconds (gaze detection that lasts for 2 seconds or more and less than 5 seconds), the control unit 13 ends displaying the guide message. Then, the display area of the display is divided into multiple sub-areas (for example, four sub-areas), and pieces of information on multiple stores are displayed on the multiple sub-areas, respectively. For example, pieces of attribute information (a name, a place, a photograph of an external appearance, a product, or the like) on the multiple stores are displayed on the multiple sub-areas, respectively, using a still image (a digest or a moving image may be used). The still image is not limited to an entire sub-area being necessarily stationary, and a portion (for example, a letter, a symbol, or the like, which are not the advertisement itself) of the image may move.

It should be noted that it is assumed that a store to be recommended is set to be a store in accordance with the number of the persons who are viewing the display. For example, a store (for example, a diner) where one person alone can visit comfortably may be recommended in the case where the number of the persons who are viewing the display is 1. Furthermore, a store for a couple (for example, a place to bring a date) may be recommended in the case where the number of the persons who are viewing the display is 2, and a store for a family (for example, a restaurant) may be recommended in a case where the number of the persons who are viewing the display is equal to or greater than 3.

Furthermore, when the display browsing time is 5 or more seconds (gaze detection that lasts for 5 seconds or more and less than 30 seconds), the control unit 13 decides a sub-area (for example, a sub-area that is being viewed by the greatest number of persons, a sub-area that is viewed for the greatest time of period) that draws attention, of the multiple sub-areas. Then, a change is made to a layout of the display area of the display, and information on a store that is displayed on the sub-area which draws attention is displayed on a large-sized screen. Furthermore, a moving image containing detailed information on the store is reproduced on the large-sized screen.

It should be noted that the control unit 13 may make a change to only content that is displayed on the sub-area which draws attention in such a manner as to display a moving image, without displaying the display of the large-sized screen described above and without making a change to the layout of the multiple sub-areas on the display.

In this manner, the control unit 13 can display a still image in a case where the display browsing time is shorter than a fifth reference time and can display a moving image in a case where the display browsing time is equal to or longer than the fifth reference time. The fifth reference time is arbitrarily set in advance.

Furthermore, when the display browsing time is 30 or more seconds (gaze detection that lasts for 30 or more seconds), the control unit 13 displays coupon information on a store relating to the moving image that is reproduced, on the display.

In this manner, when the display browsing time is equal to or longer than the sixth reference time, the control unit 13 can display coupon information on the display. The sixth reference time is arbitrarily set in advance.

It should be noted that, while, the display area of the display is divided into multiple sub-areas and content is displayed on each of the multiple sub-areas, the control unit 13 may set a ratio of an area occupied by at least one of the multiple sub-areas on the display to be a ratio in accordance with a ratio of the number of the persons who are viewing the sub-area. Furthermore, the control unit 13 may perform switching on brightness of each of the multiple sub-areas on the display, according to the number of the persons who are viewing each of the multiple sub-areas.

An example of processing by the apparatus 10 for providing information according to the present example embodiment is the same as that according to the second example embodiment.

With the information providing system according to the present example embodiment, which is described above, an advantageous effect that is the same as those according to the first and second example embodiments can be realized.

Furthermore, with the information providing system according to the present example embodiment, switching of displaying on the display can be performed. The number of the persons who are viewing the display indicates an attribute of a person or a group that is viewing the display. By providing content in accordance with the number of the persons who are viewing the display, information suitable for the viewer can be provided.

MODIFICATION EXAMPLES

Modification examples applicable to the first to third example embodiments are described.

Modification Example 1

Figure 7:
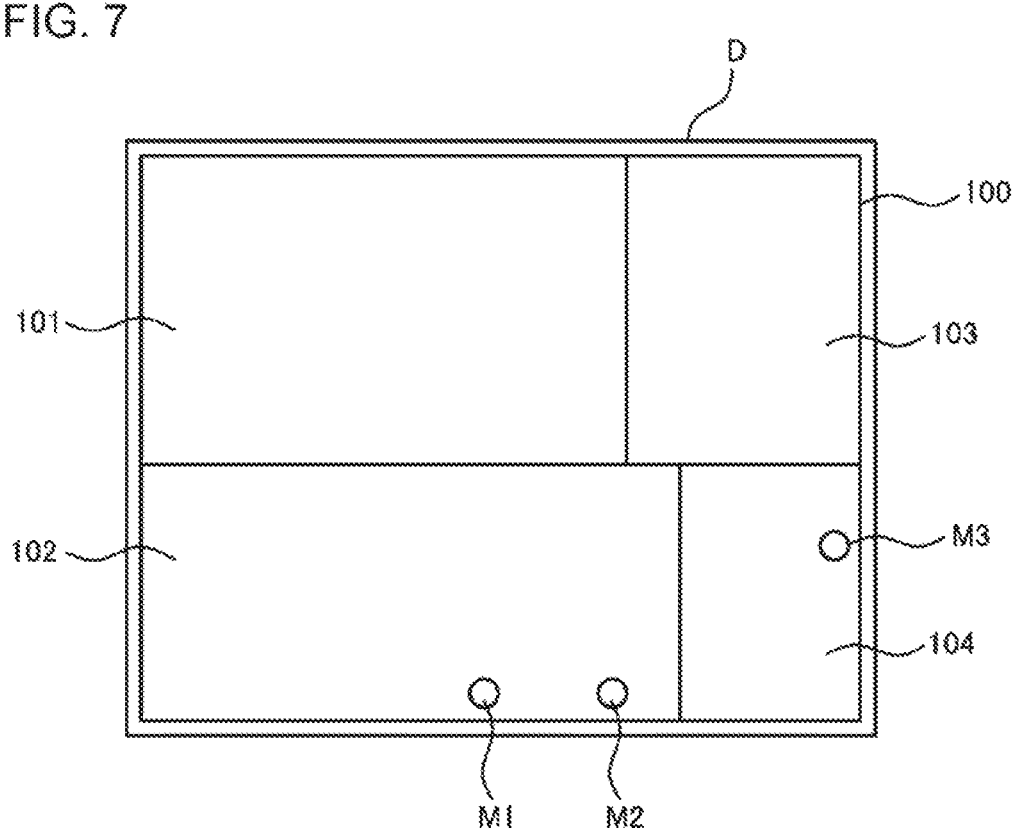
FIG. 7 is a diagram schematically illustrating an example of the mode for the displaying on the display according to the present example embodiment.

The control unit 13 may display information indicating a position on the display, which is being viewed by a person extracted from the captured image, on the display. FIG. 7 illustrates an example of this. FIG. 7 illustrates browsing positions of three viewers, with marks M1 to M3, respectively. It should be noted that multiple marks may be distinguishable in appearance from one other on the basis of a color, a shape, or the like.

With the modification example, the viewer can easily recognize positions on the display, which is being viewed by the viewer or other persons. As a result, in addition to being able to watch the display with a feeling of playing a game, the trend of other persons can be recognized.

Modification Example 2

The control unit 13 may control the display in such a manner that different items of content are viewed according to watching directions. For example, by dispersing light from the display in multiple directions, content can be viewed differently from the multiple directions. The displaying can be realized by utilizing a viewing angle control technology. Furthermore, using a result of the image analysis by the image analysis unit 12 makes it possible to determine from which direction of the multiple directions each viewer is viewing.

By utilizing the technology, for example, in a case where multiple viewer are viewing the same display or the same sub-area, a timing for reproducing the moving image described above or a timing for displaying the coupon information can be caused to vary among viewers.

For example, the control unit 13 may decide content that is to be displayed on the display, in such a manner that a moving image is viewed from a position or an angle at which the number of the persons who are watching the display is relatively great and that a still image is viewed from a position or an angle at which the number of the persons who are watching the display is relatively small. The still image is not limited to an entire sub-area being necessarily stationary, and a portion (for example, a letter, a symbol, or the like, which are not the advertisement itself) of the image may move.

For example, content that is viewed from the rightward direction of the display, content that is viewed from in front of the display, and content that is viewed from the leftward direction can be set to be different items of content. Specifically, when persons, of which the number is equal to or greater than a reference number, are viewing a sub-are from the right side of the display and the sub-area browsing time thereof is equal to or longer than the third reference time (or when either condition is satisfied), for the persons who are viewing the sub-area from the right side of the display, a moving image is displayed on the sub-area. On the other hand, for persons who are viewing the sub-area from in front of the display or from the left side of the display, a still image is displayed on the sub-area in a case where the number of the persons viewing the sub-area from in front of the display or from the left side of the display is smaller than the reference number and the sub-area browsing time thereof is shorter than the third reference time (or when either condition is satisfied).

In the modification example, suitable content can be provided to each of the multiple viewers.

Modification Example 3

The apparatus 10 for providing information may total up results of the analysis by the image analysis unit 12 and may generate total data. An example of the total data is illustrated in FIGS. 8 to 11.

Figure 8:
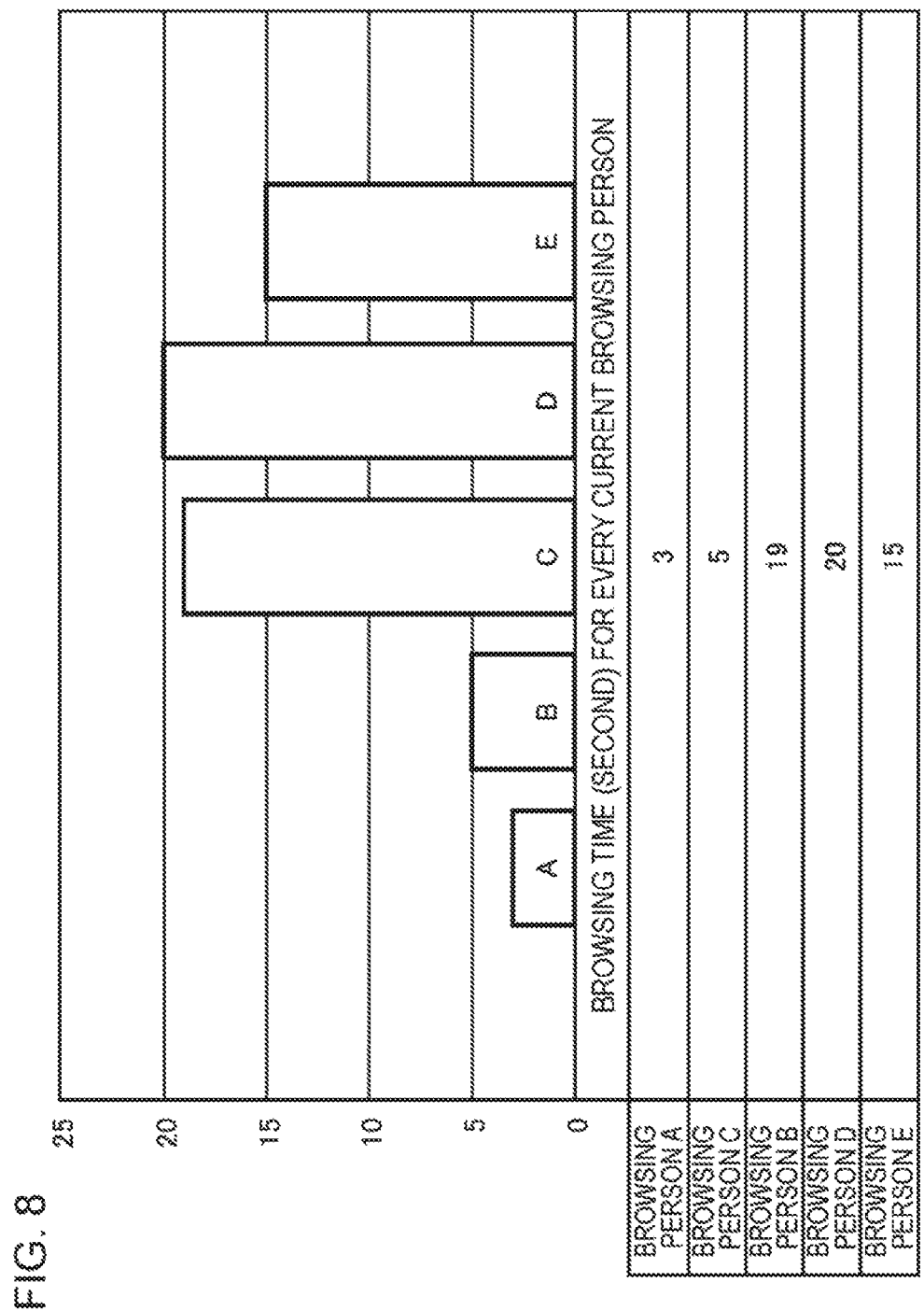
FIG. 8 is a diagram schematically illustrating an example of information that is generated by the apparatus for providing information according to the present example embodiment.

The total data in FIG. 8 results from computing the display browsing time for every viewer who are currently watching the display and graphing results of the computation.

Figure 9:
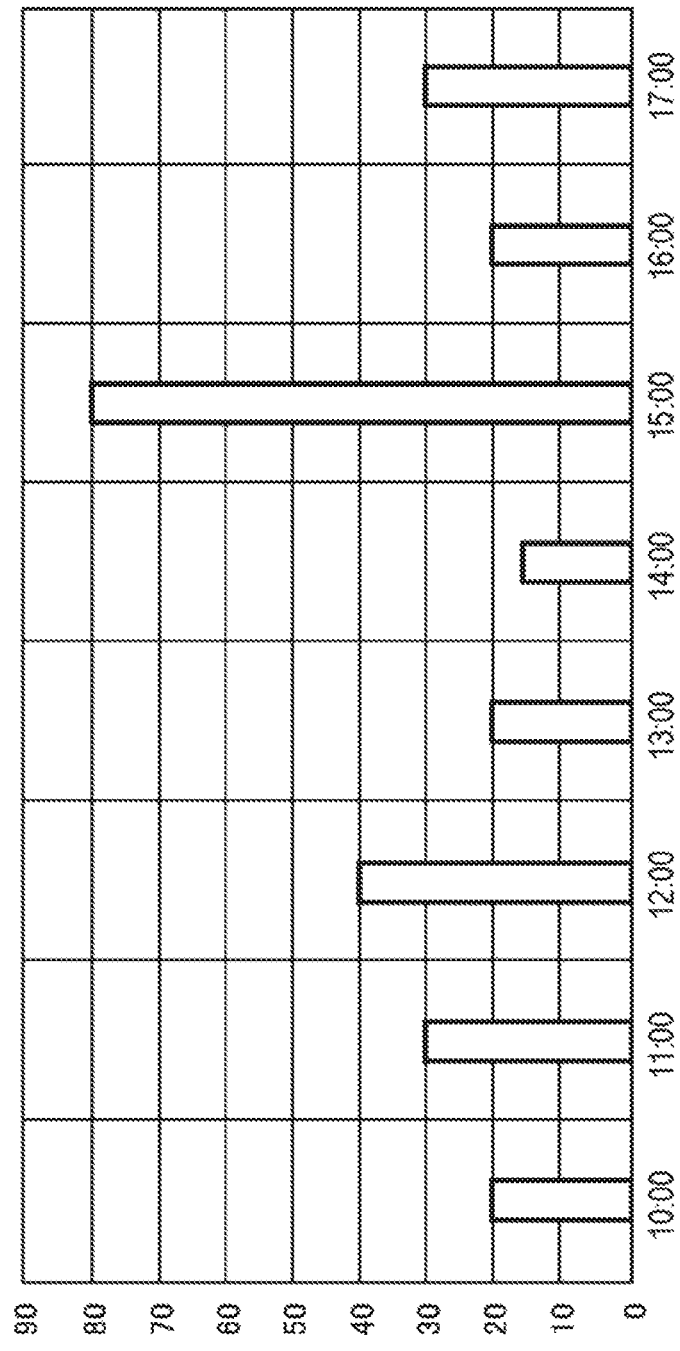
FIG. 9 is a diagram schematically illustrating an example of the information that is generated by the apparatus for providing information according to the present example embodiment.

The total data in FIG. 9 results from computing the number of viewers for every time span and graphing results of the computation.

Figure 10:
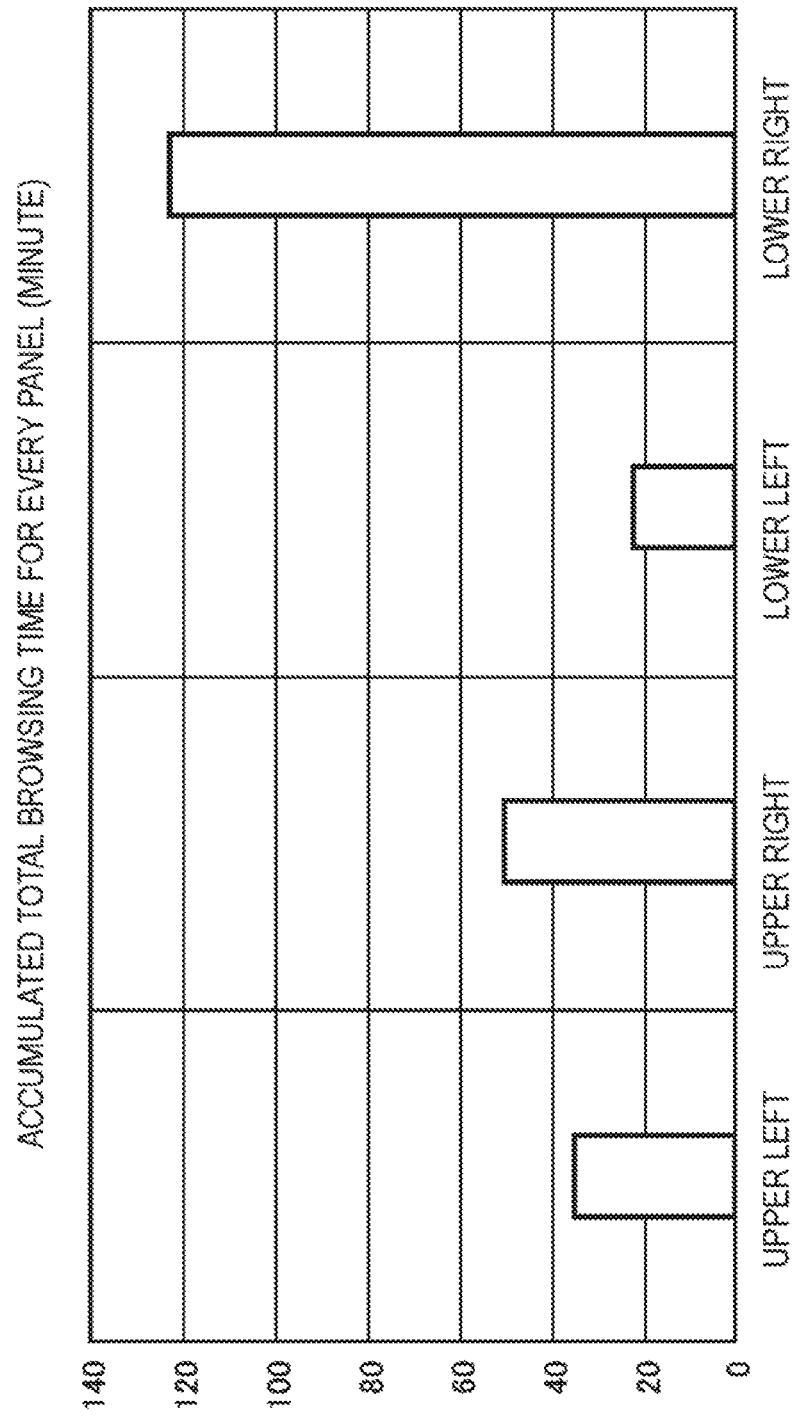
FIG. 10 is a diagram schematically illustrating an example of the information that is generated by the apparatus for providing information according to the present example embodiment.

The total data in FIG. 10 results from computing an accumulated total of the sub-area browsing times for every sub-area (panel) (for example, an accumulated total for one day) and graphing result of the computation.

Figure 11:
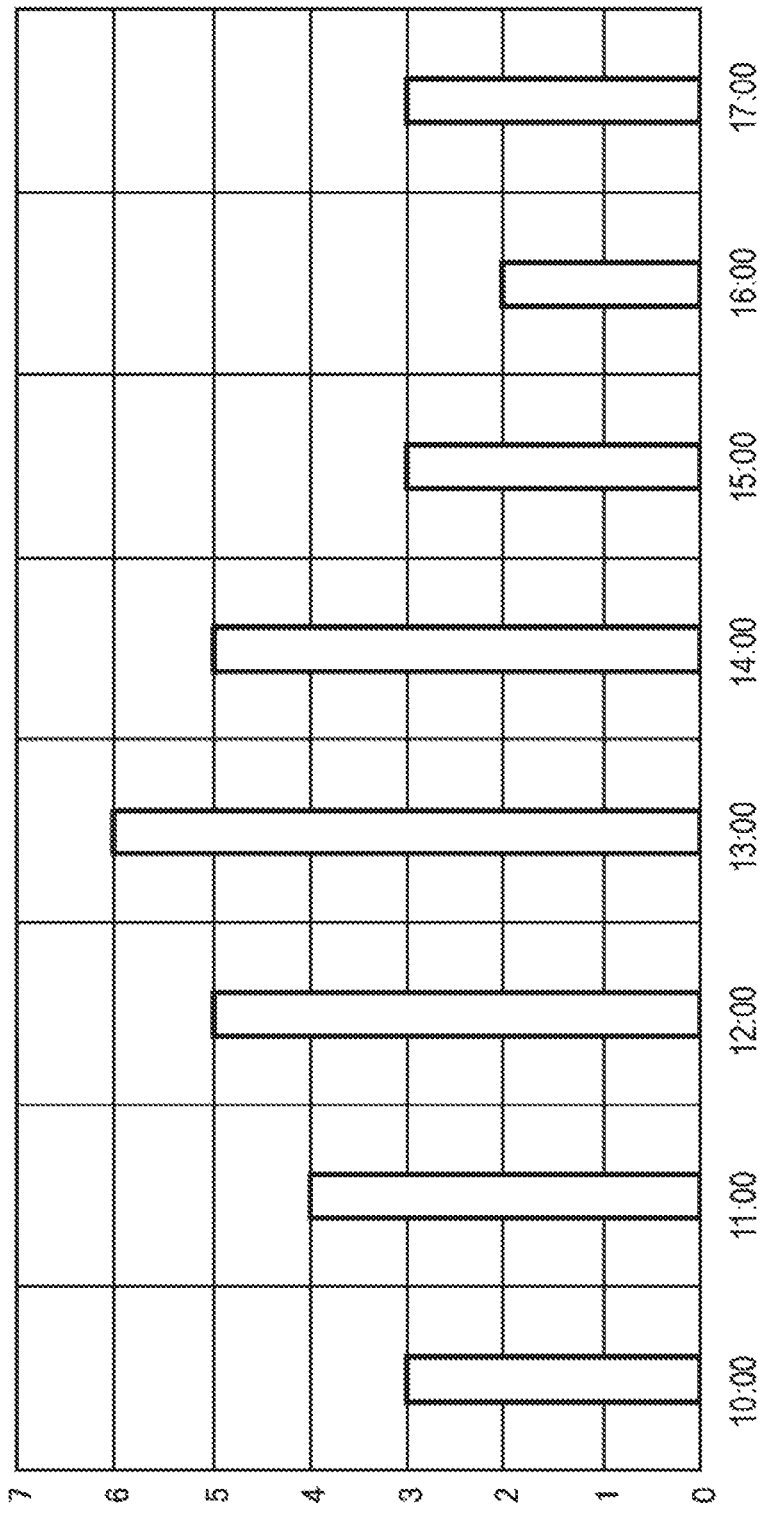
FIG. 11 is a diagram schematically illustrating an example of the information that is generated by the apparatus for providing information according to the present example embodiment.

The total data in FIG. 11 results from computing an average of the display browsing times per one viewer and graphing results of the computation.

In the modification example, a utilization situation of the display can be digitalized. Then, on the basis of the total data, a change can be made to a position for disposing the display, a detail of content, or the like.

Examples of a reference embodiment will be added as appendixes as follows.

1. An apparatus for providing information, the apparatus including: an acquisition unit that acquires a captured image obtained by imaging the vicinity of a display; an image analysis unit that detects a position on the display, which is being viewed by a person extracted from the captured image; and a control unit that divides a display area of the display into multiple sub-areas, displays content on each of the multiple sub-areas, and makes a change to the displaying on the sub-area that is being viewed by the person extracted from the captured image.

2. The apparatus for providing information according to 1, in which the image analysis unit detects a sub-area browsing time that is a period of time for which the person extracted from the captured image is viewing the sub-area that is predetermined, and in which the control unit decides content that is to be displayed on the sub-area which is being viewed by the person extracted from the captured image, according to the sub-area browsing time.

3. The apparatus for providing information according to 2, in which the control unit displays a still image in a case where the sub-area browsing time is shorter than a first reference time, and displays a moving image in a case where the sub-area browsing time is equal to or longer than the first reference time.

4. The apparatus for providing information according to 2 or 3, in which, when the sub-area browsing time is equal to or longer than a second reference time, the control unit displays coupon information.

5. The apparatus for providing information according to 2, in which the image analysis unit further detects the number of persons who are viewing each of the multiple sub-areas, and in which the control unit decides content that is to be displayed on the sub-area which is being viewed by the person extracted from the captured image, according to the sub-area browsing time and the number of the persons who are viewing each of the multiple sub-areas.

6. The apparatus for providing information according to 5, in which the control unit displays a still image in a case where the number of the persons, the sub-area browsing time of each of whom is equal to or longer than a third reference time, is smaller than the first reference number of persons, and displays a moving image in a case where the number of the persons, the sub-area browsing time of each of whom is equal to or longer than the third reference time, is equal to or greater than the first reference number of persons.

7. The apparatus for providing information according to 5 or 6, in which the control unit displays coupon information when the number of the persons, the sub-area browsing time of each of whom is equal to or longer than a fourth reference time, is equal to or greater than the second reference number of persons.

8. An apparatus for providing information, the apparatus including: an acquisition unit that acquires a captured image obtained by imaging the vicinity of a display; an image analysis unit that analyzes the captured image, to extract a face of a person from the captured image and detect the number of persons who are viewing the display, and a display browsing time that is a period of time for which the display is being viewed; and a control unit that decides content that is to be displayed on the display, according to a result of the detection.

9. The apparatus for providing information according to 8, in which the control unit displays a still image in a case where the display browsing time is shorter than a fifth reference time, and displays a moving image in a case where the display browsing time is equal to or longer than the fifth reference time.

10. The apparatus for providing information according to 8 or 9, in which, when the display browsing time is equal to or longer than a sixth reference time, the control unit displays coupon information on the display.

11. The apparatus for providing information according to any one of 5 to 10, in which, in a case where a face of a person is extracted from the captured image, but where the number of the persons who are viewing the display is smaller than a predetermined number, the control unit causes the display to perform an operation of drawing person's attention.

12. The apparatus for providing information according to any one of 5 to 11, in which the control unit sets a ratio of an area occupied by at least one of the multiple sub-areas on the display to be a ratio in accordance with a ratio of the number of the persons who are viewing the sub-area.

13. The apparatus for providing information according to any one of 5 to 12, in which, the control unit performs switching on brightness of each of the multiple sub-areas on the display, according to the number of the persons who are viewing each of the multiple sub-areas.

14. The apparatus for providing information according to any one of 1 to 13, in which the control unit individually makes a change to the content that is displayed on each of the multiple sub-areas, without making a change to a layout of the multiple sub-areas on the display.

15. The apparatus for providing information according to any one of 1 to 14, in which, in a case where a face of a person is not extracted from the captured image, the control unit causes the display to operate in a power saving mode.

16. The apparatus for providing information according to any one of 1 to 15, in which the image analysis unit detects a position on the display, which is being viewed by the extracted person, and in which the control unit displays information indicating the position on the display, which is being viewed by the person extracted from the captured image, on the display.

17. The apparatus for providing information according to any one of 1 to 16, in which the control unit controls the display in such a manner that different content items are viewed according to watching directions.

18. The apparatus for providing information according to any one of 1 to 17, in which the control unit decides content that is to be displayed on the display, in such a manner that a moving image is viewed from a direction in which the number of the persons who are watching the display is relatively great and that a still image is viewed from a direction in which the number of the persons who are watching the display is relatively small.

19. A method of providing information, which is performed by a computer, the method including: an acquisition step of acquiring a captured image obtained by imaging the vicinity of a display; an image analysis step of detecting a position on the display, which is being viewed by a person extracted from the captured image; and a control step of dividing a display area of the display into multiple sub-areas, displaying content on each of the multiple sub-areas, and making a change to the displaying on the sub-area that is being viewed by the person extracted from the captured image.

20. A program that causes a computer to function as: an acquisition unit that acquires a captured image obtained by imaging the vicinity of a display; an image analysis unit that detects a position on the display, which is being viewed by a person extracted from the captured image; and a control unit that divides a display area of the display into multiple sub-areas, displays content on each of the multiple sub-areas, and makes a change to the displaying on the sub-area that is being viewed by the person extracted from the captured image.

21. A method of providing information, which is performed by a computer, the method including: an acquisition step of acquiring a captured image obtained by imaging the vicinity of a display; an image analysis step of analyzing the captured image, to extract a face of a person from the captured image and detect the number of persons who are viewing the display, and a display browsing time that is a period of time for which the display is being viewed; and a control step of deciding content that is to be displayed on the display, according to a result of the detection.

22. A program that causes a computer to function as: an acquisition unit that acquires a captured image obtained by imaging the vicinity of a display; an image analysis unit that analyzes the captured image, to extract a face of a person from the captured image and detect the number of persons who are viewing the display, and a display browsing time that is a period of time for which the display is being viewed; and a control unit that decides content that is to be displayed on the display, according to a result of the detection.

This application claims priority based on Japanese Patent Application No. 2017-120735, filed on Jun. 20, 2017, the entire disclosure of which is incorporated by reference herein in its entirety.

What is claimed is:

1. An apparatus for providing information, the apparatus comprising:
at least one memory configured to store one or more instructions; and
at least one processor configured to execute the one or more instructions to:
acquire a captured image obtained by imaging the vicinity of a display;
detect a position on the display, which is being viewed by a person extracted from the captured image;
divide a display area of the display into multiple sub-areas, display content on each of the multiple sub-areas, and make a change to the displaying on the sub-area that is being viewed by the person extracted from the captured image;
detect a sub-area browsing time that is a period of time for which the person extracted from the captured image is viewing the sub-area that is predetermined; and
decide content that is to be displayed on the sub-area which is being viewed by the person extracted from the captured image, according to the sub-area browsing time.

2. The apparatus for providing information according to claim 1,
wherein the processor is further configured to execute the one or more instructions to display a still image in a case where the sub-area browsing time is shorter than a first reference time, and display a moving image in a case where the sub-area browsing time is equal to or longer than the first reference time.

3. The apparatus for providing information according to claim 1,
wherein the processor is further configured to execute the one or more instructions to display coupon information, when the sub-area browsing time is equal to or longer than a second reference time.

4. The apparatus for providing information according to claim 1,
wherein the processor is further configured to execute the one or more instructions to:
detect the number of persons who are viewing each of the multiple sub-areas, and
decide content that is to be displayed on the sub-area which is being viewed by the person extracted from the captured image, according to the sub-area browsing time and the number of the persons who are viewing each of the multiple sub-areas.

5. The apparatus for providing information according to claim 4,
wherein the processor is further configured to execute the one or more instructions to display a still image in a case where the number of the persons, the sub-area browsing time of each of whom is equal to or longer than a third reference time, is smaller than the first reference number of persons, and display a moving image in a case where the number of the persons, the sub-area browsing time of each of whom is equal to or longer than the third reference time, is equal to or greater than the first reference number of persons.

6. The apparatus for providing information according to claim 4,
wherein the processor is further configured to execute the one or more instructions to display coupon information when the number of the persons, the sub-area browsing time of each of whom is equal to or longer than a fourth reference time, is equal to or greater than the second reference number of persons.

7. The apparatus for providing information according to claim 1,
wherein the processor is further configured to execute the one or more instructions to individually make a change to the content that is displayed on each of the multiple sub-areas, without making a change to a layout of the multiple sub-areas on the display.

8. The apparatus for providing information according to claim 1,
wherein the processor is further configured to execute the one or more instructions to cause the display to operate in a power saving mode, in a case where a face of a person is not extracted from the captured image.

9. The apparatus for providing information according to claim 1,
wherein the processor is further configured to execute the one or more instructions to:
detect a position on the display, which is being viewed by the extracted person, and
display information indicating the position on the display, which is being viewed by the person extracted from the captured image, on the display.

10. The apparatus for providing information according to claim 1,
wherein the processor is further configured to execute the one or more instructions to control the display in such a manner that different content items are viewed according to watching directions.

11. The apparatus for providing information according to claim 1,
wherein the processor is further configured to execute the one or more instructions to decide content that is to be displayed on the display, in such a manner that a moving image is viewed from a direction in which the number of the persons who are watching the display is relatively great and that a still image is viewed from a direction in which the number of the persons who are watching the display is relatively small.

12. A method of providing information, which is performed by a computer, the method comprising:
acquiring a captured image obtained by imaging the vicinity of a display;
detecting a position on the display, which is being viewed by a person extracted from the captured image; and
dividing a display area of the display into multiple sub-areas, displaying content on each of the multiple sub-areas, and making a change to the displaying on the sub-area that is being viewed by the person extracted from the captured image;
detecting a sub-area browsing time that is a period of time for which the person extracted from the captured image is viewing the sub-area that is predetermined; and
deciding content that is to be displayed on the sub-area which is being viewed by the person extracted from the captured image, according to the sub-area browsing time.

13. A non-transitory storage medium storing a program that causes a computer to:
acquire a captured image obtained by imaging the vicinity of a display;

detect a position on the display, which is being viewed by a person extracted from the captured image;

divide a display area of the display into multiple sub-areas, display content on each of the multiple sub-areas, and make a change to the displaying on the sub-area that is being viewed by the person extracted from the captured image;

detect a sub-area browsing time that is a period of time for which the person extracted from the captured image is viewing the sub-area that is predetermined; and decide content that is to be displayed on the sub-area which is being viewed by the person extracted from the captured image, according to the sub-area browsing time.

* * * * *